United States Patent
Makarov et al.

(10) Patent No.: US 11,101,554 B2
(45) Date of Patent: Aug. 24, 2021

(54) DUAL ANTIPHASE ANTENNA FOR BETTER SIGNAL TRANSMISSION INTO HUMAN BODY OR SIGNAL RECEPTION FROM HUMAN BODY

(71) Applicant: Neva Electromagnetics, LLC, Yarmouth Port, MA (US)

(72) Inventors: Sergey N Makarov, Holden, MA (US); Gregory M Noetscher, Shrewsbury, MA (US); Viktor Makarov, Holden, MA (US); Ara Nazarian, Wellesly, MA (US)

(73) Assignee: Neva Electromagnetics, LLC, Yarmouth Port, MA (US)

( * ) Notice: Subject to any disclaimer, the term of this patent is extended or adjusted under 35 U.S.C. 154(b) by 0 days.

(21) Appl. No.: 16/502,346

(22) Filed: Jul. 3, 2019

(65) Prior Publication Data
US 2019/0326666 A1    Oct. 24, 2019

Related U.S. Application Data

(63) Continuation-in-part of application No. 15/872,324, filed on Jan. 16, 2018, now Pat. No. 10,657,338.

(51) Int. Cl.
*H01Q 1/36* (2006.01)
*H04B 13/00* (2006.01)
*H01Q 5/392* (2015.01)

(52) U.S. Cl.
CPC ............ *H01Q 1/36* (2013.01); *H01Q 5/392* (2015.01); *H04B 13/005* (2013.01)

(58) Field of Classification Search
CPC ........ H01Q 1/36; H01Q 5/392; H01Q 3/2623; H01Q 9/0407; H01Q 1/273; H01Q 21/28; H04B 13/005
See application file for complete search history.

(56) References Cited

U.S. PATENT DOCUMENTS

| | | |
|---|---|---|
| 6,285,901 B1 | 9/2001 | Talcher et al. |
| 7,601,120 B2 | 10/2009 | Moilanen et al. |
| 8,301,221 B2 | 10/2012 | DiSilvestro et al. |
| 8,449,556 B2 | 5/2013 | Roche |
| 9,496,601 B1 * | 11/2016 | Bevelacqua ........... H01Q 1/241 |
| 9,589,482 B2 | 3/2017 | Baldwin et al. |

(Continued)

FOREIGN PATENT DOCUMENTS

JP    2000245736 A    9/2009

OTHER PUBLICATIONS

Meaney et al., 3D Microwave Bone Imaging, 6th European Conference on Antennas and Propagation, Mar. 26-30, 2012.
Meaney et al., Bone Dielectric Property Variation as a Function of Mineralization at Microwave Frequencies, International Journal of Biomedical Engineering, vol. 2012, Article ID 649612, 9, Jan. 16, 2012.

(Continued)

*Primary Examiner* — Matthew Mikels
(74) *Attorney, Agent, or Firm* — Morris, Manning & Martin, LLP; Daniel E. Sineway, Esq.

(57) ABSTRACT

The present invention relates to a new on-body dual antiphase antenna design and a plurality of its modifications to better transmit a radio frequency signal into human or animal body, or receive a radio frequency signal from human or animal body. The antiphase transmission and/or reception is achieved by connecting each individual patch antenna to a 180 degrees microwave power splitter or to a 180 degrees microwave power combiner.

10 Claims, 8 Drawing Sheets

(56) References Cited

U.S. PATENT DOCUMENTS

| | | |
|---|---|---|
| 2005/0190106 A1* | 9/2005 | Anguera Pros .......... H01Q 1/36 |
| | | 343/700 MS |
| 2006/0241377 A1 | 10/2006 | James |
| 2007/0117524 A1* | 5/2007 | Do ......................... H04B 1/44 |
| | | 455/83 |
| 2007/0238992 A1 | 10/2007 | Donofrio et al. |
| 2009/0124215 A1* | 5/2009 | Nysen .................... H01Q 21/28 |
| | | 455/90.1 |
| 2010/0152584 A1 | 6/2010 | Ariav et al. |
| 2011/0263961 A1* | 10/2011 | Craddock ............ H01Q 21/064 |
| | | 600/407 |
| 2012/0296234 A1 | 11/2012 | Wilhelm et al. |
| 2013/0018240 A1 | 1/2013 | McCoy |
| 2014/0125526 A1* | 5/2014 | Hong .................... H01Q 1/243 |
| | | 343/700 MS |

OTHER PUBLICATIONS

Meaney et al., Clinical Microwave Tomographic Imaging of the Calcaneus: A First-in-Human Case Study of Two Subjects, IEEE Transactions on Biomedical Engineering, vol. 59, No. 12, Dec. 2012.

Zhou et al., Microwave Tomographic Imaging for Osteoporosis Screening: a Pilot Clinical Study, 32nd Annual International Conference of the IEEE EMBS Buenos Aires, Argentina, Aug. 31-Sep. 4, 2010.

Golnabi et al.,Microwave Tomography for Bone Imaging, IEEE International Symposium on Biomedical Imaging, Chicago Mar. 30-Apr. 2, 2011.

\* cited by examiner

FIGS. 1a-d

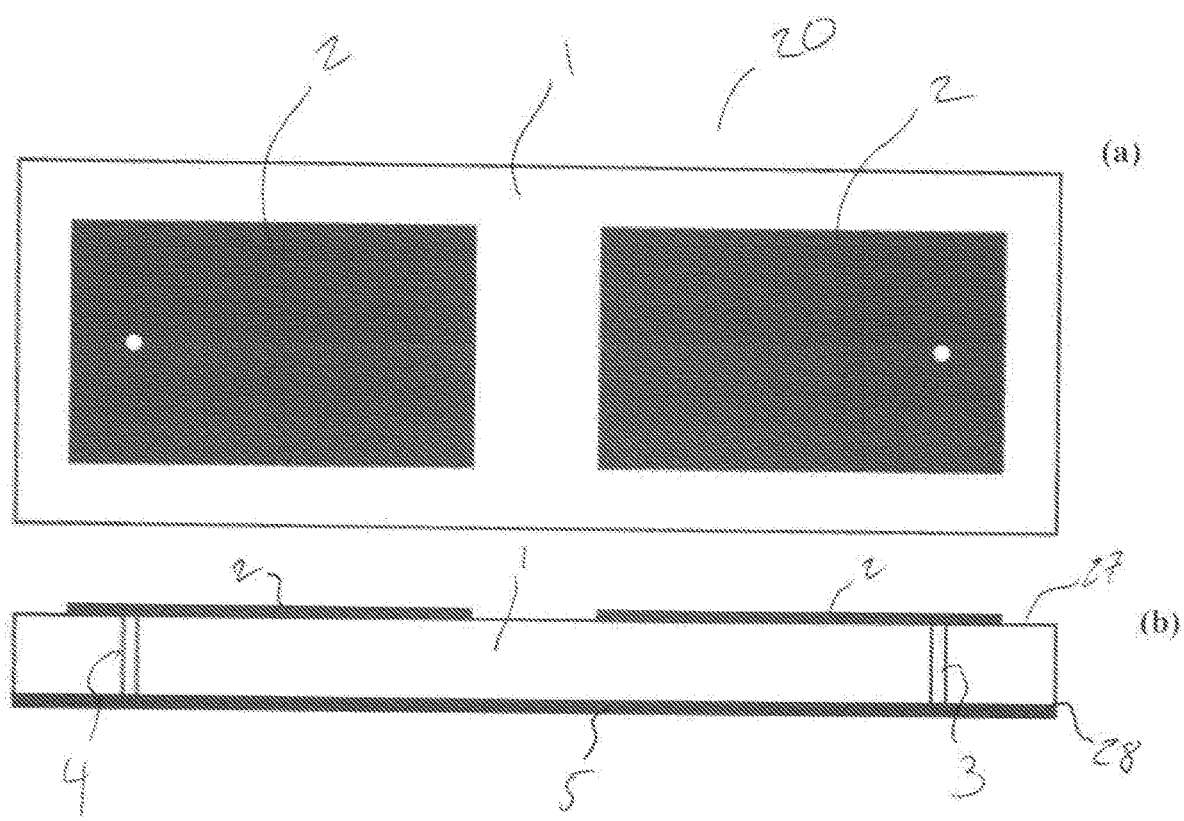
FIGS. 3 (a) and (b)

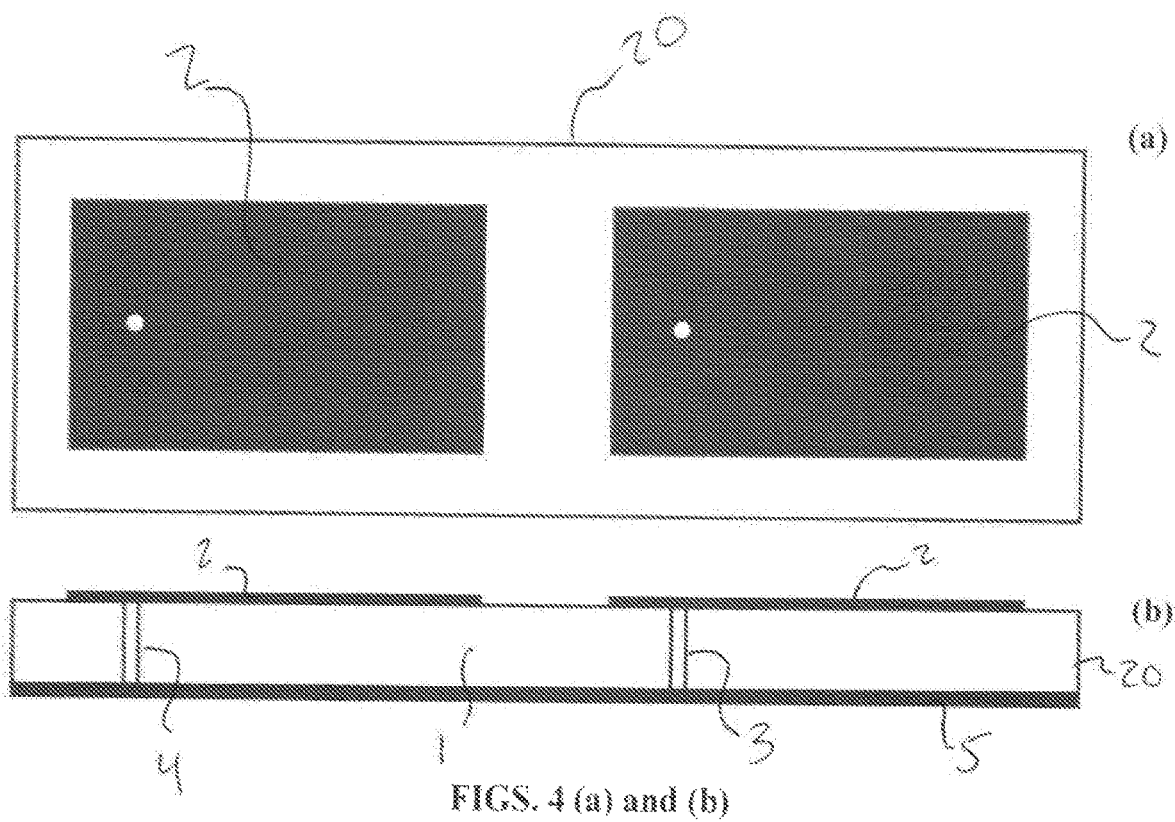
FIGS. 4 (a) and (b)

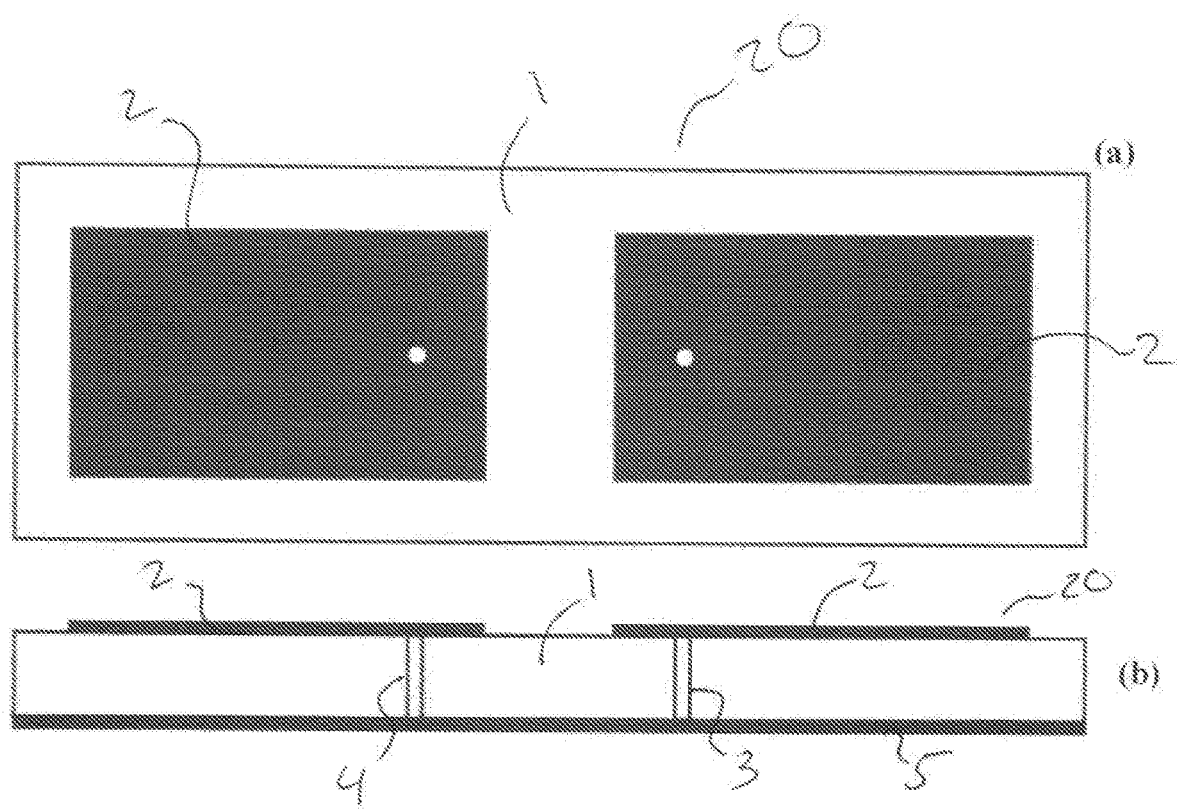
FIGS. 5 (a) and (b)

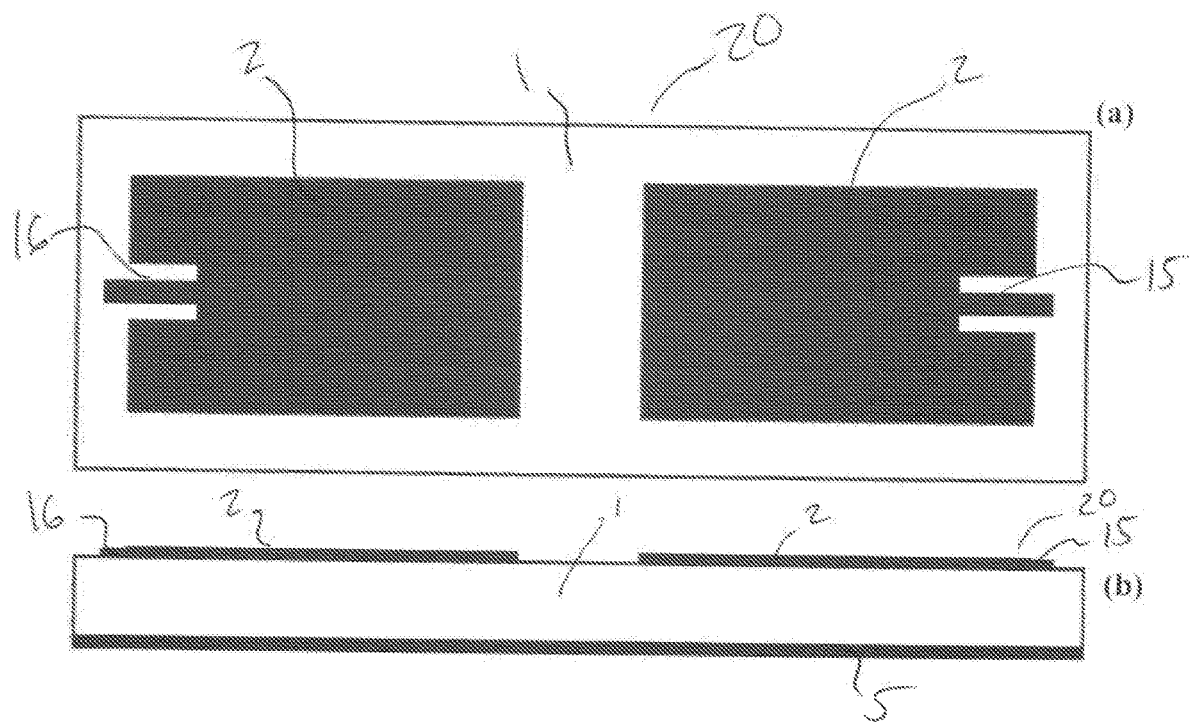
FIGS. 6 (a) and (b)

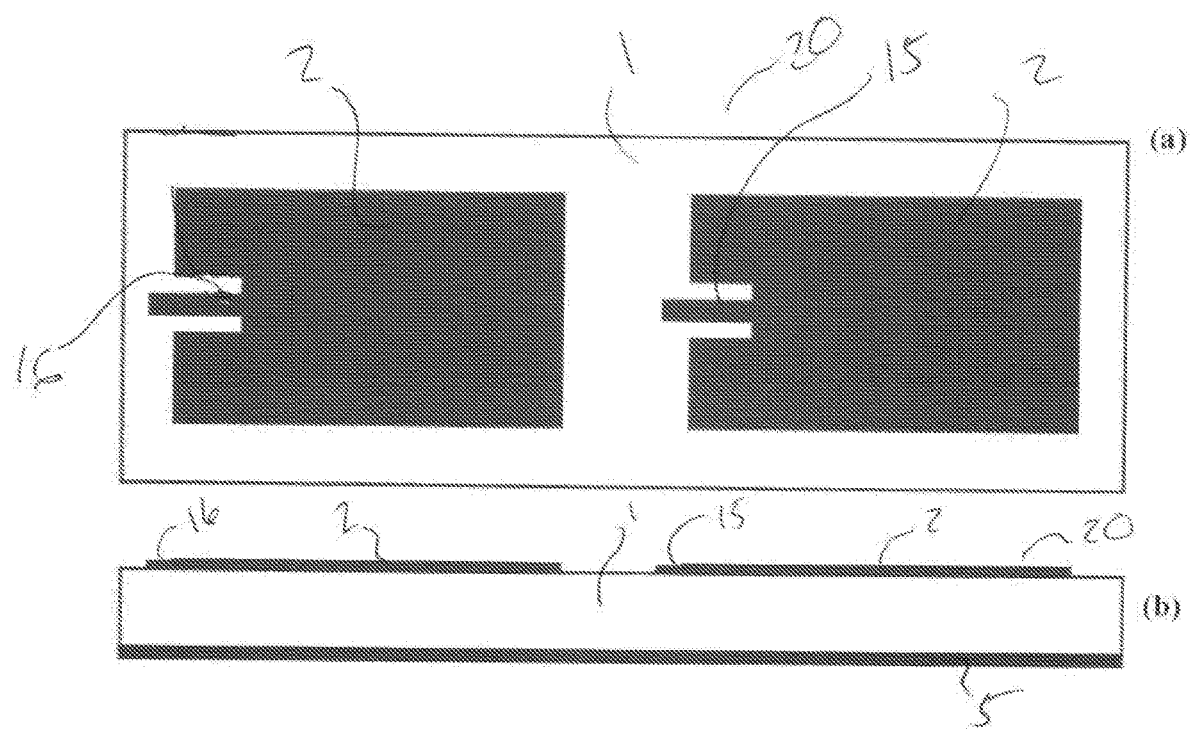
FIGS. 7 (a) and (b)

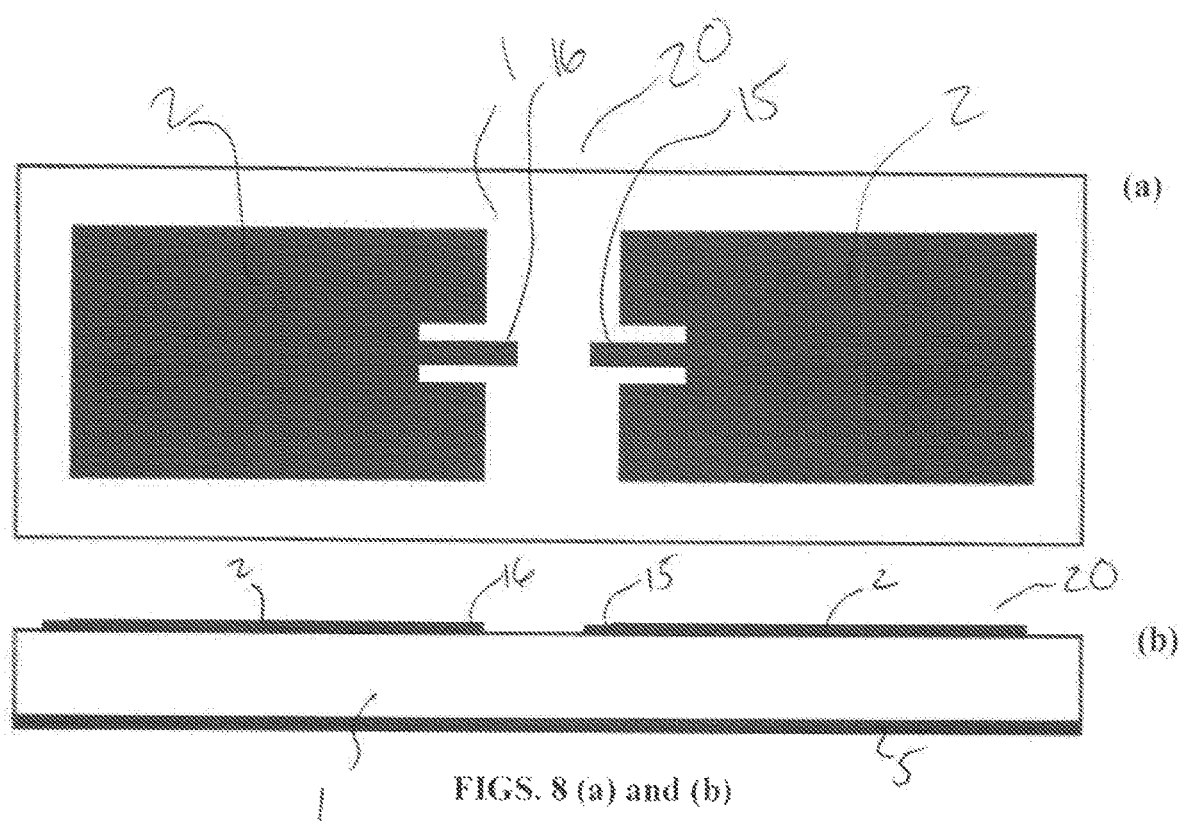
FIGS. 8 (a) and (b)

DUAL ANTIPHASE ANTENNA FOR BETTER SIGNAL TRANSMISSION INTO HUMAN BODY OR SIGNAL RECEPTION FROM HUMAN BODY

CROSS-REFERENCE TO RELATED APPLICATIONS

This application is a continuation of U.S. patent application Ser. No. 15/872,324 filed Jan. 16, 2018, now U.S. Pat. No. 10,657,338.

FIELD OF THE INVENTION

The present invention relates to a new dual antenna design and a plurality of its modifications to better transmit a radio frequency signal into human or animal body, or receive a radio frequency signal from human or animal body.

BACKGROUND OF THE INVENTION

Dedicated antennas for radiating into the body or receiving from the body are located on the skin surface. They are applicable to wireless body area networks, microwave imaging, as well as implanted body sensors and actuators. Such antennas include loops and coils, broadband monopoles/dipoles and their modern printed versions as well as small-size arrays. More recently, wideband and multiband single patch antennas have been suggested and investigated including slotted antennas. Emphasis is usually on the (ultra) wideband performance. Single slotted patch antennas, single printed dipoles and loops, and spiral antennas suffer from a lower transmission coefficient through the body.

The dual antiphase antenna of the present invention applies a different technical approach. Instead of using a single antenna radiator or a conventional directional array of in-phase radiators, two closely-spaced single patch antennas driven in antiphase (with the signals of opposite polarity) are used. The two antiphase antenna radiators provide a greater penetration depth and transmitted signal into the body than one single antenna or the two adjacent antennas driven in phase (with the same signal polarity). This observation has been justified via numerical modeling and experimentally.

Accordingly, the present invention applies this approach to a plurality of dual antiphase antenna configurations and to a plurality of dual antiphase antenna applications.

The preferred application is receiving a wireless signal from an implanted sensor located within the body to a dual antiphase antenna, which is located on the body surface. It is pertinent to communications with implanted body sensors, in particular with cardiac sensors, via a body area network.

The further application is receiving a wireless signal from a smart pill located within a gastrointestinal tract to a dual antiphase antenna, which is located on the body surface. It is pertinent to gastroenterology telemetry with smart pills via a body area network.

The further application is microwave propagation between two or more on-body antiphase antennas through upper or lower extremities. It is pertinent to microwave imaging for bone density estimation.

The further application is microwave breast cancer imaging with two or more on-body dual antiphase antennas. It is pertinent to microwave breast cancer screening and detection.

The further application is microwave head imaging with on-body dual antiphase antennas. It is pertinent to stroke and TBI (traumatic brain injury) detection.

SUMMARY OF THE INVENTION

The present invention provides a specialized antenna for a wireless transmitter/receiver comprising plurality of dual anaphase antennas for use on the human body or other mammal. In a preferred embodiment, the dual antiphase antenna consists of two closely-spaced identical single patch antennas of a small size. In a preferred embodiment, the single patch antenna consists of a metal ground plane, a dielectric substrate, and a top or surface metal patch. The surface patch may be transmitting or receiving.

In a preferred embodiment, the two closely-spaced single patch antennas of a small size must be driven in antiphase, with the signals of opposite polarity, and with the top patches facing toward the body. The dual anaphase antenna of the present invention may be a transmit antenna or receive antenna with a wide bandwidth (in excess of 50%).

In a preferred embodiment, the antiphase transmission and/or reception is achieved by connecting each individual patch antenna to a 180 degrees microwave power splitter or to a 180 degrees microwave power combiner, respectively. The power splitter or power combiner is preferably wideband or broadband.

In a preferred embodiment, each patch antenna is independently matched to a certain impedance prior to connecting to a power splitter/combiner, via an impedance matching network. The preferred matching impedance value for a 900 MHz frequency band is approximately 10-j5 ohms and the impedance tolerance is approximately 30% or ±3±j1.5 ohms when FR4 dielectric substrate is used. This value assures a wide antenna bandwidth. It may change for other dielectric substrates and for other frequency bands.

In a preferred embodiment, the power splitter/combiner and the two impedance matching networks can either be the three separate blocks or they can be assembled together using one printed circuit.

In a preferred embodiment, the output of the power splitter/combiner is directly connected to a microwave transmitter (an RF power amplifier) or to a receiver (a low noise front end amplifier), respectively. This completes the dual antiphase antenna assembly and connection.

In a preferred embodiment, each of the plurality of patch antennas are either probe-fed or microstrip-fed, with or without an inset. The feeds of each of the patch antennas may be located at the furthest distance from each other (preferred), at the closest distance from each other, or close to any edge of the patch.

In a preferred embodiment, the individual patch antennas use the same solid substrate. The substrate materials used may include, but are not limited to FR4, alumina, or Rogers ceramics. Alternatively, the individual patch antennas may use individual solid substrates. In a further embodiment, the individual patch antennas may be printed on a flexible substrate.

In a preferred embodiment, the top patches of the two patch antennas must be located as close as possible to the body. In a preferred embodiment, the top patches should be placed in direct contact with the body. In further embodiments methods such as pressure, gels, and adhesives may be used to ensure contact of the top patches with the body.

In a preferred embodiment, each of the patch antennas of the present invention may use a single top patch without slots or parasitic patches. However, the patch antennas my use a slotted top patch, stacked top patch, or a top patch with parasitic elements.

In a preferred embodiment, the dual antiphase antenna has the total size of approximately 2" by ¾" and thickness of approximately 128 mil when operating in the 900 MHz band and when FR4 substrate is used. This size approximately proportionally decreases with increasing frequency.

In a further embodiment, alternatives to the top rectangular patches may be used including, but not limited to planar inverted F antennas (PIFAs) pointing toward the body and forming the dual antiphase antenna, top printed loops pointing toward the body and forming the dual antiphase antenna with or without the ground plane, and top printed dipoles or monopoles pointing toward the body and also forming the dual antiphase antenna, with or without the ground plane.

In a preferred embodiment, the dual antiphase antenna is used singularly with an implanted medical device such as cardiac device, or diabetic monitor, or a smart pill, via a body area network. In a further embodiment two or more dual antiphase antenna may be used for microwave imaging across the human body such as with bone density screening, breast cancer screening, and stroke/head injuries microwave detection.

BRIEF DESCRIPTION OF THE DRAWINGS

FIGS. 3a and b is a schematic representation of a preferred configuration of the dual antiphase antenna with the probe feeds on the opposite sides of the top patches.

FIGS. 4a and b is a schematic representation of a further configuration of the dual antiphase antenna with the probe feeds in echelon.

FIGS. 5a and b is a schematic representation of a further configuration of the dual antiphase antenna with the probe feeds on the closest sides of the top patches.

FIGS. 6a and b is a schematic representation of a preferred configuration of the dual antiphase antenna with the microstrip feeds on the opposite sides of the top patches.

FIGS. 7a and b is a schematic representation of a further configuration of the dual antiphase antenna with the microstrip feeds in echelon.

FIGS. 8a and b is a schematic representation of a further configuration of the dual antiphase antenna with the microstrip feeds on the closest sides of the top patches.

DETAILED DESCRIPTION OF THE DRAWINGS

Figure 1:
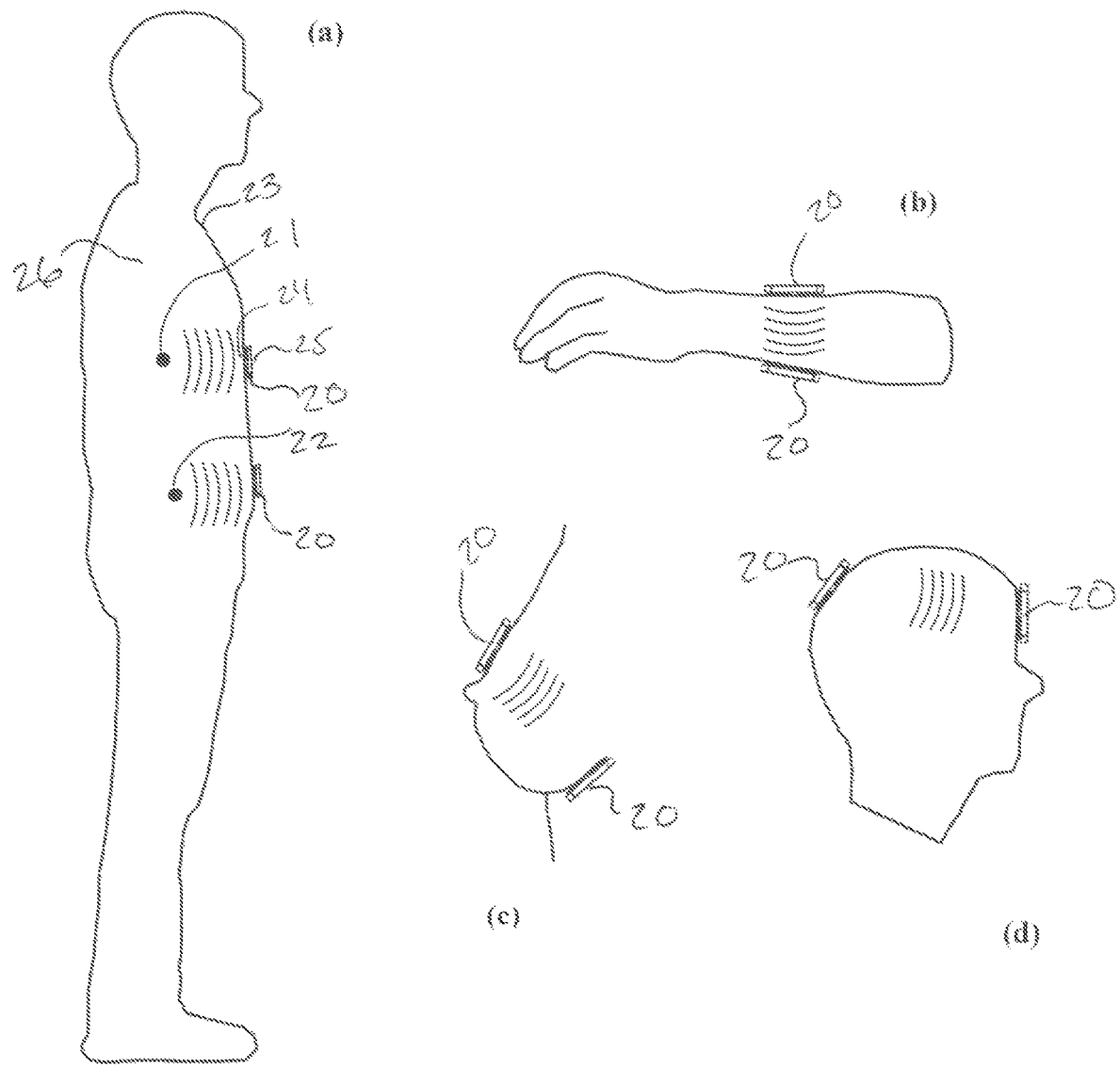
FIGS. 1a-d are schematic representations of the preferred and further applications of the dual antiphase antenna.

FIG. 1a is a schematic representation of the preferred application of the dual antiphase antenna 20 receiving a wireless signal from an implanted sensor 21 to the dual antiphase antenna 20. The top 24 of dual antiphase antenna 20 is placed on or in close proximity to the epidermal layer 23 of a mammal 26 while the bottom 25 faces away from the epidural layer 23 of the mammal 26. This application is pertinent to communications with implanted body sensors, in particular with cardiac sensors, via a body area network.

FIG. 1a includes a schematic representation of another application of the dual antiphase antenna 20 receiving a wireless signal from a smart pill 22 to the dual antiphase antenna 20. It is pertinent to gastroenterology telemetry with smart pills via a body area network.

FIG. 1b is a schematic representation of another application of the dual antiphase antenna 20 wherein microwave propagation between two antiphase antennas 20 through upper or lower extremities is analyzed. It is pertinent to microwave imaging for bone density estimation.

FIG. 1c is a schematic representation of another application of the dual antiphase antenna 20 wherein microwave antiphase antennas 20 are used for breast cancer imaging. It is pertinent to microwave breast cancer screening and detection.

FIG. 1d is a schematic representation of another application of the dual antiphase antenna 20 showing microwave head imaging with dual antiphase antennas 20. It is pertinent to stroke and TBI (traumatic brain injury) detection.

Figure 2:
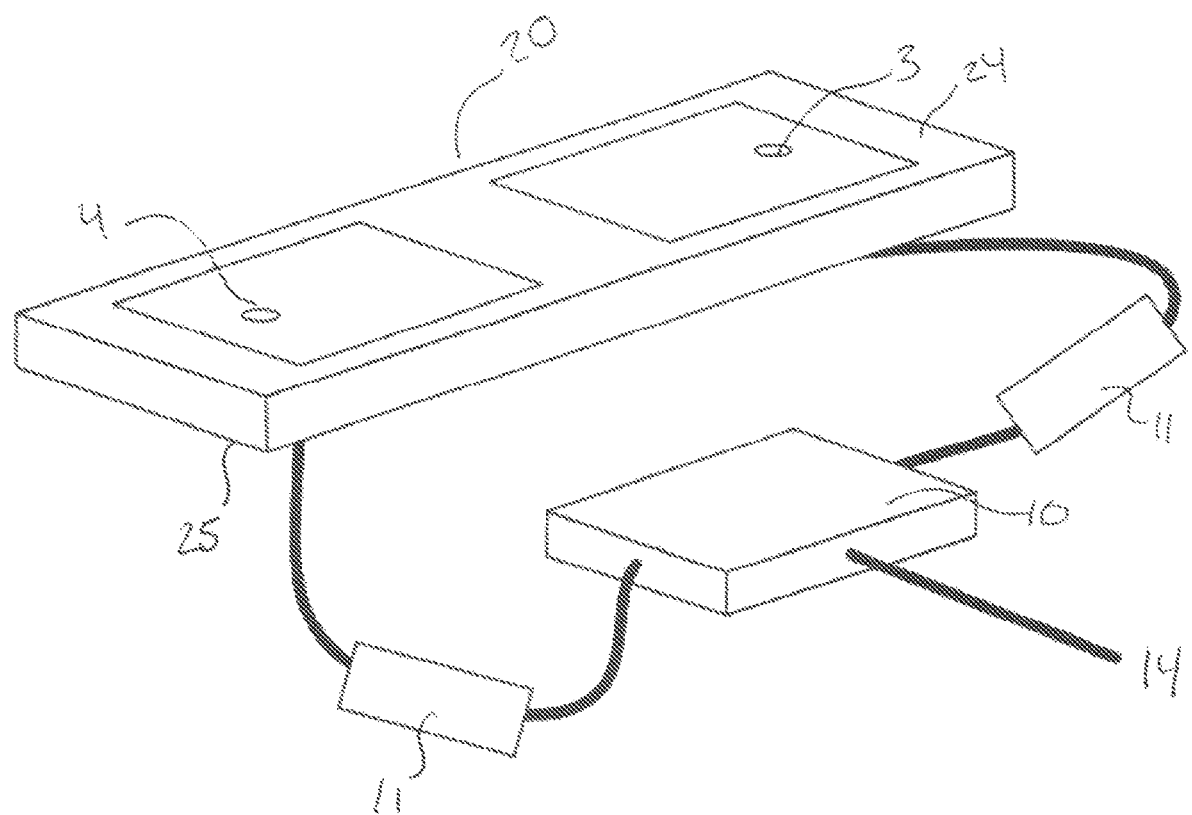
FIG. 2 is a schematic representation of a preferred configuration of the dual antiphase antenna with two impedance matching networks and a 180 degrees power splitter/combiner, which is further connected to a transmitter/receiver.

FIG. 2 shows a schematic representation of a preferred configuration of the dual antiphase antenna 20 wherein the patch antenna feeds 3 and 4 are as far apart as possible. The dual antiphase antenna 20, with top 24 and bottom 25, is fed via a 180 degrees power splitter/combiner 10 connected to the antennas through two matching networks 11. The power splitter 10 is further connected to either transmitter or receiver 14. When using a printed circuit, the power splitter/combiner 10 and the two matching networks 11 may be combined together into one single block.

FIG. 3a shows a top view schematic representation of a preferred configuration of the dual antiphase antenna 20 with a probe feed. The dual antiphase antenna 20 is comprised of dielectric substrate 1 and two surface patches 2. FIG. 3b shows a side view schematic representation of a preferred configuration of the dual antiphase antenna 20 consisting of dielectric substrate 1, two surface patches 2, patch antenna feeds 3, 4, and a ground plane 5. The dielectric substrate 1 consists of a first side 27 and a second side 28. The two surface patches 2 are located the first side 27 of the dielectric substrate 1 and the ground plane is located on the second side 28 of the dielectric substrate 1. In this preferred configuration the feeds 3 and 4 are located close to the opposite edges of patches 2.

FIG. 4a shows a top view schematic representation of a further configuration of the dual antiphase antenna 20 with a probe feed comprised of dielectric substrate 1 and two surface patches 2. FIG. 4b shows a side view schematic representation of the dual antiphase antenna 20 consisting of dielectric substrate 1, two surface patches 2, patch antenna feeds 3, 4, and a ground plane 5. The feeds 3 and 4 are located in echelon, similar to the standard patch antenna array.

FIG. 5a shows a top view schematic representation of a preferred configuration of the dual antiphase antenna 20 with a probe feed consisting of dielectric substrate 1 and two surface patches 2. FIG. 5b shows a side view schematic representation of the dual antiphase antenna 20 with a probe feed consisting of dielectric substrate 1, two surface patches 2, patch antenna feeds 3, 4, and a ground plane 5. The feeds are located close to the nearest edges of patches 2.

FIG. 6a shows a top view schematic representation of a preferred configuration of the dual antiphase antenna 20 with a microstrip feed. The dual antiphase antenna 20 consists of dielectric substrate 1 and two surface patches 2 and antenna feeds 15 and 16. FIG. 6b shows a side view schematic representation of the dual antiphase antenna 20 with a microstrip feed consisting of dielectric substrate 1, two surface patches 2, antenna feeds 15, 16, and a ground plane 5. The feeds 15 and 16 are located close to the opposite edges of patches 2.

FIG. 7a shows a schematic representation of a further configuration of the dual antiphase antenna 20 with a microstrip feed. The dual antiphase antenna 20 consists of dielectric substrate 1, two surface patches 2, and patch antenna feeds 15 and 16. FIG. 7b is a side view schematic representation of dual antiphase antenna 20 with a microstrip feed consisting of dielectric substrate 1, two surface patches 2, and patch antenna feeds 15, 16, and a ground plane 5. The feeds 15 and 16 are located in echelon, similar to the standard patch antenna array.

FIG. 8a shows a top view schematic representation of a further configuration of the dual antiphase antenna 20 with a microstrip feed. The dual antiphase antenna 20 consists of dielectric substrate 1, two surface patches 2, and patch antenna feeds 15, 16. FIG. 8b shows a side view schematic representation of the dual antiphase antenna 20 with a microstrip feed consisting of dielectric substrate 1, two surface patches 2, and patch antenna feeds 15, 16, and a ground plane 5. The feeds 15 and 16 are located close to the nearest edges of patches 2.

We claim:

1. A dual antiphase antenna for radiofrequency signal transmission to a mammalian body or reception from a mammalian body comprising;
    at least two closely spaced identical antenna elements directly coupled to the body wherein an antenna element separation distance is on the order of one tenth of the wavelength and wherein the at least two closely spaced identical antenna elements are driven in antiphase with 180° phase shift,
    at least one of the two dual antiphase antenna is coupled to the body and connected to a transmitter,
    at least one of the two dual antiphase antenna is coupled to the body and connected to a receiver, and
    at least one pressure sensor is attached to the body.

2. A dual antiphase antenna of claim 1 wherein each identical antenna element further comprises;
    a patch antenna, wherein the patch antenna comprises a dielectric substrate comprising a first side and a second side and the first side comprises at least two surface patches and the second side comprises a ground plane, with a patch directly coupled to the body,
    each of at least two surface patches further comprises an opposite edge, a near edge and a probe feed for the patch antenna located on the opposite edges of the at least two patches.

3. A dual antiphase antenna of claim 2 wherein the probe feeds of the at least two surface patches are placed in echelon similar to a standard patch array design.

4. A dual antiphase antenna of claim 1 wherein each identical antenna element comprises a printed dipole antenna with a dipole directly coupled to the body.

5. A dual antiphase antenna of claim 1 wherein each identical antenna element comprises a printed loop antenna with a loop directly coupled to the body.

6. A dual antiphase antenna of claim 1 wherein each antenna element further comprises a lumped antenna-matched network.

7. The dual antiphase antenna of claim 1 further comprising a radiofrequency power meter for measuring a transmission coefficient between the at least two dual antiphase antennas as a function of frequency.

8. The dual antiphase antenna of claim 1 further comprising a vector network analyzer for measuring a transmission coefficient between the at least two dual antiphase antennas as a function of frequency.

9. A dual antiphase antenna for radiofrequency signal transmission to a mammalian body or reception from a mammalian body comprising:
    at least two closely spaced identical antenna elements directly coupled to the body, wherein an antenna element separation distance is on the order of one tenth of the wavelength and wherein the at least two closely spaced identical antenna elements are driven in antiphase with 180° phase shift, and
    each antenna element further comprises a lumped antenna-matched network.

10. A dual antiphase antenna for radiofrequency signal transmission to a mammalian body or reception from a mammalian body comprising:
    at least two closely spaced identical antenna elements directly coupled to the body, wherein an antenna element separation distance is on the order of one tenth of the wavelength and wherein the at least two closely spaced identical antenna elements are driven in antiphase with 180° phase shift, and
    each identical antenna element further comprises:
        a patch antenna, wherein the patch antenna comprises a dielectric substrate comprising a first side and a second side and the first side comprises at least two surface patches and the second side comprises a ground plane, with a patch directly coupled to the body,
        each of at least two surface patches further comprises an opposite edge, a near edge and a probe feed for the patch antenna located on the opposite edges of the at least two patches, and
        the probe feeds of the at least two surface patches are placed in echelon similar to a standard patch array design.

* * * * *